US012613162B2

(12) United States Patent
Rosander et al.

(10) Patent No.: US 12,613,162 B2
(45) Date of Patent: Apr. 28, 2026

(54) TEST FIXTURE WITH TUNABLE STROKE AND RESISTANCE TO VEHICLE SEAT MOVEMENT DURING TESTING

(71) Applicant: Toyota Motor Engineering & Manufacturing North America, Inc., Plano, TX (US)

(72) Inventors: Kyle E. Rosander, Saline, MI (US); Phouvadol P. Khouphongsy, Saline, MI (US); Tejaswi Mule, Westland, MI (US); Robert J. Stauffer, South Lyon, MI (US); Zachary T. Pawson, Deerfield, MI (US); Louis J. Brady, Romulus, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 793 days.

(21) Appl. No.: 17/947,431

(22) Filed: Sep. 19, 2022

(65) Prior Publication Data

US 2024/0094093 A1 Mar. 21, 2024

(51) Int. Cl.
　　*G01M 99/00* (2011.01)
　　*G01N 3/04* (2006.01)
　　　　(Continued)

(52) U.S. Cl.
　　CPC ............. *G01M 99/001* (2013.01); *G01N 3/04* (2013.01); *G01N 3/10* (2013.01); *G01N 3/14* (2013.01); *G01N 3/16* (2013.01)

(58) Field of Classification Search
　　CPC .. G01N 3/14; G01N 3/10; G01N 3/08; G01N 3/16; G01N 3/04; G01M 99/001
　　See application file for complete search history.

(56) References Cited

U.S. PATENT DOCUMENTS 3,274,425 A * 9/1966 Sciaky .................. H01J 37/067
　　　　　　　　　　　　　　　　313/271
4,630,716 A * 12/1986 Faust ..................... B62D 1/192
　　　　　　　　　　　　　　　　188/371

(Continued)

OTHER PUBLICATIONS

Report No. 207-KAR-10-005, Compliance Testing for FMVSS 207, Seating Systems, 2010 Nissan Cube 5-Door MPV, NHTSA No. CA5203, prepared by Karco Engineering, LLC https://static.nhtsa.gov/odi/ctr/2010/TRTR-641379-2010-001.pdf, Sep. 23, 2010, pp. 1-108 (108 pages).

(Continued)

*Primary Examiner* — Paul M. West

(74) *Attorney, Agent, or Firm* — Christopher G. Darrow; Darrow Mustafa PC

(57) ABSTRACT

A test fixture for a testing a vehicle seat mounting includes a first portion and a second portion separate from the first portion and having a fulcrum supported thereon. An energy absorbing member is attached to the test fixture first portion and extends around a portion of the fulcrum. The energy absorbing member is formed so as to have a first shape when the test fixture first portion and second portion are spaced apart less than a predetermined distance. The test fixture is structured so that movement of the second portion in a direction away from the first portion causes the fulcrum to slide along the energy absorbing member. Sliding of the fulcrum along the energy absorbing member plastically deforms the energy absorbing member into a second shape different from the first shape.

11 Claims, 8 Drawing Sheets

(51) Int. Cl.
| | |
|---|---|
| *G01N 3/10* | (2006.01) |
| *G01N 3/14* | (2006.01) |
| *G01N 3/16* | (2006.01) |

(56) References Cited

U.S. PATENT DOCUMENTS

| | | | | |
|---|---|---|---|---|
| 5,178,017 | A * | 1/1993 | Dinzburg | G01N 3/20 |
| | | | | 73/849 |
| 2016/0102725 | A1 * | 4/2016 | Slaven | F16F 7/123 |
| | | | | 188/374 |
| 2020/0408671 | A1 * | 12/2020 | Deng | G01N 19/02 |

OTHER PUBLICATIONS

U.S. Department of Transportation, National Highway Traffic Safety Administration, Laboratory Test Procedure for FMVSS 207, Seating Systems (available at https://www.nhtsa.gov/sites/nhtsa.gov/files/tp-207-09a.pdf), Jun. 18, 1992, pp. 1-46 (46 pages).

* cited by examiner

EA Strip Tapered - Instron Pull

TEST FIXTURE WITH TUNABLE STROKE AND RESISTANCE TO VEHICLE SEAT MOVEMENT DURING TESTING

TECHNICAL FIELD

The embodiments disclosed herein relate to testing of automotive vehicle components and, more particularly, to the testing of seat mountings used to mount vehicle seats to a frame of the vehicle.

BACKGROUND

Testing of automotive structures and components using rigid frame structures is standard in the automotive industry. These frame structures are designed to be "infinitely rigid" under the applicable testing loads to promote reusability of the structures. For example, safety testing of some vehicle components (e.g., seats, seat mountings, and seatbelts) may be performed on a rigid frame structure before these components are installed in an actual vehicle. The rigid frame structures may be designed to simulate a portion of a frame of an actual vehicle by enabling vehicle seat mountings and seats to be attached to the frame for test purposes. Such testing enables the effects of collisions and other loadings on the vehicle body to be evaluated during the vehicle design phase.

The use of actual vehicle frame structures to simulate the vehicle body can be expensive. Also, an actual vehicle frame structure is typically unavailable for testing during the component evaluation phase of testing. Thus, it is desirable to test vehicle components without destroying the frame structure or rendering the structure unusable for further testing. Use of an "infinitely rigid" fixture can help achieve this goal. However, an actual vehicle frame structure may deform under severe loading. For example, pre-testing and post-testing views of a rear seat cushion frame for a pickup truck subjected to dynamic and quasi-static loading simulating a rear impact load are shown in drawing FIGS. 3A and 3B, respectively (described in greater detail herein). Such deformation of the frame structure can provide important information regarding body and component performance. Because rigid test structures are designed to resist deformation, testing using a rigid frame structure does not provide important information regarding the effects of vehicle body deformation on the vehicle structure, components, and passengers. Thus, it is desirable to acquire information regarding body and component performance during loading without destroying the frame structure or impairing its usefulness for further testing.

SUMMARY

In one aspect of the embodiments described herein, a test fixture for a testing a vehicle seat mounting is provided. The test fixture includes a first portion and a second portion separate from the first portion and having a fulcrum supported thereon. An energy absorbing member is attached to the test fixture first portion and extends around a portion of the fulcrum. The energy absorbing member is formed so as to have a first shape when the test fixture first portion and second portion are spaced apart less than a predetermined distance. The test fixture is structured so that movement of the second portion in a direction away from the first portion causes the fulcrum to slide along the energy absorbing member. Sliding of the fulcrum along the energy absorbing member plastically deforms the energy absorbing member into a second shape different from the first shape.

In another aspect of the embodiments described herein, a test fixture for a testing a vehicle seat mounting is provided. The test fixture may include first a portion and a second portion separate from the first portion. The second portion may include a base, a first ear extending from the base, and a second ear extending from the base opposite the first ear. The base, first ear, and second ear may combine to define a cavity therebetween. A fulcrum may be positioned in the cavity and may extend between the first ear and the second ear. The test fixture may also include an energy absorbing member having a formed section attached to the test fixture first portion and shaped so as to extend along the test fixture first portion, into the cavity along a first side of the fulcrum, and around the fulcrum to a second side of the fulcrum within the cavity. The formed section may have a first length when the test fixture first portion and second portion are spaced apart less than a predetermined distance. In some arrangements, the test fixture first portion and second portion may be in actual physical contact with each other prior to the start of a testing sequence. The test fixture may be structured so that movement of the first portion in a direction away from the second portion causes the fulcrum to slide along the energy absorbing member, and so that sliding of the fulcrum along the energy absorbing member plastically deforms the energy absorbing member so that the formed section has a second length greater than the first length.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale. Additionally, for simplicity and clarity of illustration, and where appropriate, corresponding or analogous elements of different embodiments of the invention appearing in different figures may have similar reference numerals.

DETAILED DESCRIPTION

This disclosure relates to a test fixture for a testing a vehicle seat mounting. The test fixture includes a first portion and a second portion separate from the first portion. The second portion includes a base, a first ear extending from the base, and a second ear extending from the base opposite the first ear. The base, first ear, and second ear combine to define a cavity therebetween. A fulcrum is positioned in the cavity and extends between the first ear and the second ear. An energy absorbing member has a first end portion attached to the test fixture first portion and is formed so as to have a first shape when the first portion and second portion are spaced apart less than a predetermined distance. The test fixture is structured so that movement of the second portion in a direction away from the first portion causes the fulcrum to slide along the energy absorbing member, and so that sliding of the fulcrum along the energy absorbing member plastically deforms the energy absorbing member into a second shape different from the first shape. The bending of the energy absorbing member during movement of the vehicle seat and the attached second portion of the test fixture operates to absorb the energy of the moving seat, to enable movement of the seat during testing on an "infinitely rigid" test frame.

Figure 1:
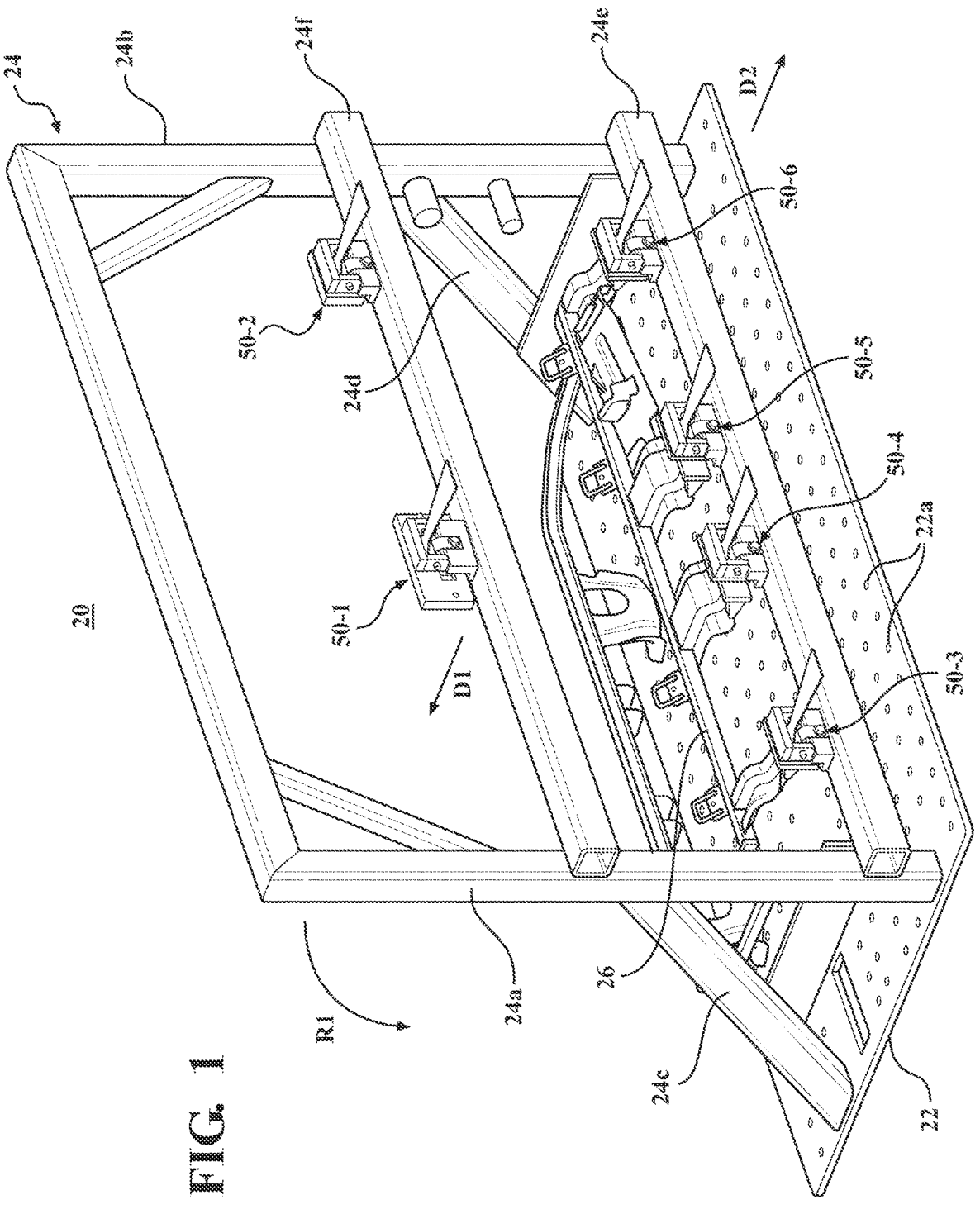
FIG. 1 is a schematic perspective view of a testing apparatus incorporating a vehicle seat mounting test fixture in accordance with an embodiment described herein, and prior to mounting of vehicle seats on the test apparatus.
Figure 2:
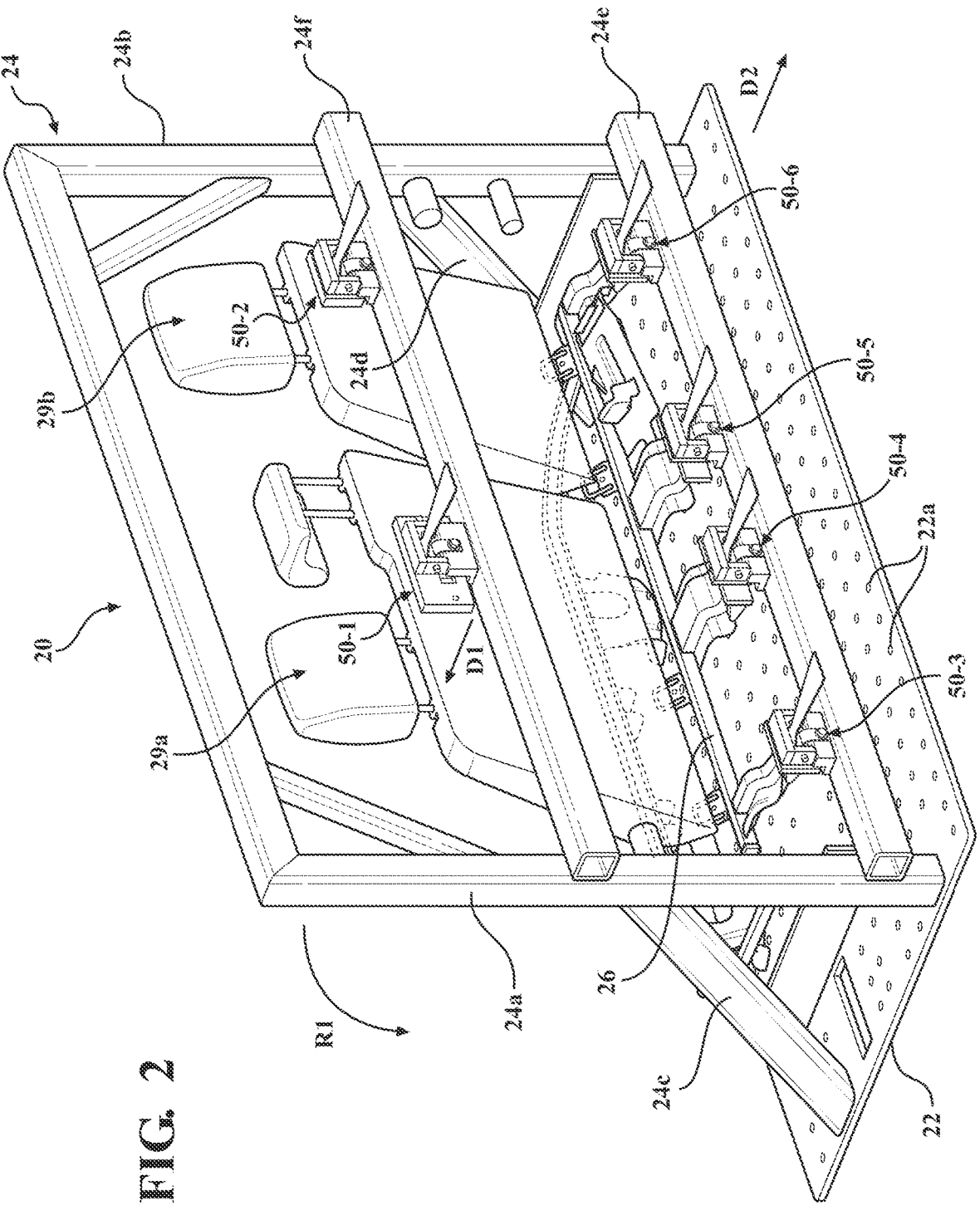
FIG. 2 is the view of FIG. 1, showing a pair of vehicle seats mounted in the testing apparatus.

FIGS. 1 and 2 are schematic perspective views of a vehicle seat mounting testing apparatus 20 in accordance with an embodiment described herein. The testing apparatus 20 may be designed to simulate a portions of a vehicle frame and body to which one or more vehicle seats are attached. The apparatus may be used to test the effect of simulated dynamic and quasi-static loads on the mountings attaching the seats to the vehicle. FIG. 1 shows the testing apparatus 20 without any vehicle seats mounted thereon. FIG. 2 is the view of FIG. 1 showing vehicle seats 29a and 29b mounted on the testing apparatus 20.

In one or more arrangements, the testing apparatus 20 may include a base portion 22 to which other elements of the testing apparatus may be mounted. In one example, the base portion 22 may be formed from a steel plate or platform having an array of spaced apart holes 22a enabling mounting of testing apparatus frame elements, instrumentation, and other parts of the testing apparatus thereon (for example, using bolts of other fastening methods). A frame (generally designated 24) may be secured to the base portion 22. Portions of a vehicle seat may be attached to the frame 24 by associated test fixtures 50 for testing as described herein. FIGS. 1 and 2 show test fixtures 50-1, 50-2, 50-3, 50-4, 50-5 and 50-6 attached to the frame 24.

The frame 24 may be constructed from rigid frame elements which are bolted, welded, or otherwise suitably attached to each other. The frame 24 may be structured to be "infinitely rigid". That is, the elements of the frame 24 may be structured and attached to each other so as not to deflect or deform (or to, at most, only minimally deflect or deform) responsive to forces applied to the frame elements during testing of a connected vehicle seat mounting and related structures. In addition, the frame elements may be structured so that any minimal deformation experienced by the frame elements may be elastic, so that the deformed frame element(s) return to their respective undeformed states as soon as the load causing deformation is removed. This built-in rigidity under load may enable the frame 24 to be used for repeated vehicle seat testing because the testing apparatus is not destroyed or permanently deformed by the test procedure.

In one or more arrangements, the frame elements may include a pair of vertically-extending frame members 24a, 24b fixed to the base portion 22. The base portion 22 and the various frame elements described herein may be structured to simulate the portions of a vehicle body to which the vehicle seats 29a and 29b and cushion underframe 26 are mounted. Sufficiently high testing loads acting on the vertically-extending frame members 24a, 24b may cause the frame members 24a, 24b to bend forwardly with respect to a front-facing vehicle seat, in direction R1, or to detach from the base portion 22. Therefore, if needed, the frame elements may also include frame member supports 24c, 24d, each frame support member being secured to the base portion 22 and extending between the base portion 22 and an associated one of each of the frame members 24a, 24b. The frame member supports 24c, 24d may be positioned so as to support the frame members 24a, 24b in resisting the testing loads. For example, for testing loads on the vehicle seat acting in a direction D1 extending forwardly of a seat coupled to the frame 24, the frame member supports 24a, 24b may be positioned and secured as shown to resist loads tending to rotate the frame members 24a, 24b in direction R1.

Referring to FIGS. 1 and 2, the frame elements may also include a lower cross-member 24e secured to and extending between the vertically-extending frame members 24a, 24b. The frame elements may also include an upper cross-member 24f secured to and extending between the vertically-extending frame members 24a, 24b above the lower cross-member 24e, at a level of an upper seat back of a seat mounted in the testing apparatus 20 for testing. As described in greater detail below, portions of the text fixtures 50 described herein may be attached to the lower cross-member 24e and upper cross-member 24f.

Referring in particular to FIG. 1, a cushion underframe 26 may be movably coupled to the base portion 22. A vehicle seat (not shown) may be secured to the cushion underframe 26 so that the seat and underframe 26 move together during testing. The cushion underframe 26 may be mounted to one or more rails, slides, or other structure(s) (not shown) secured to the base portion 22 so as to enable the cushion underframe 26 and vehicle seat(s) attached to the underframe 26 to move forwardly (in direction D1) and rearwardly (in direction D2 opposite direction D1) with respect to the cross-members 24e, 24f during seat testing.

Figure 3A:
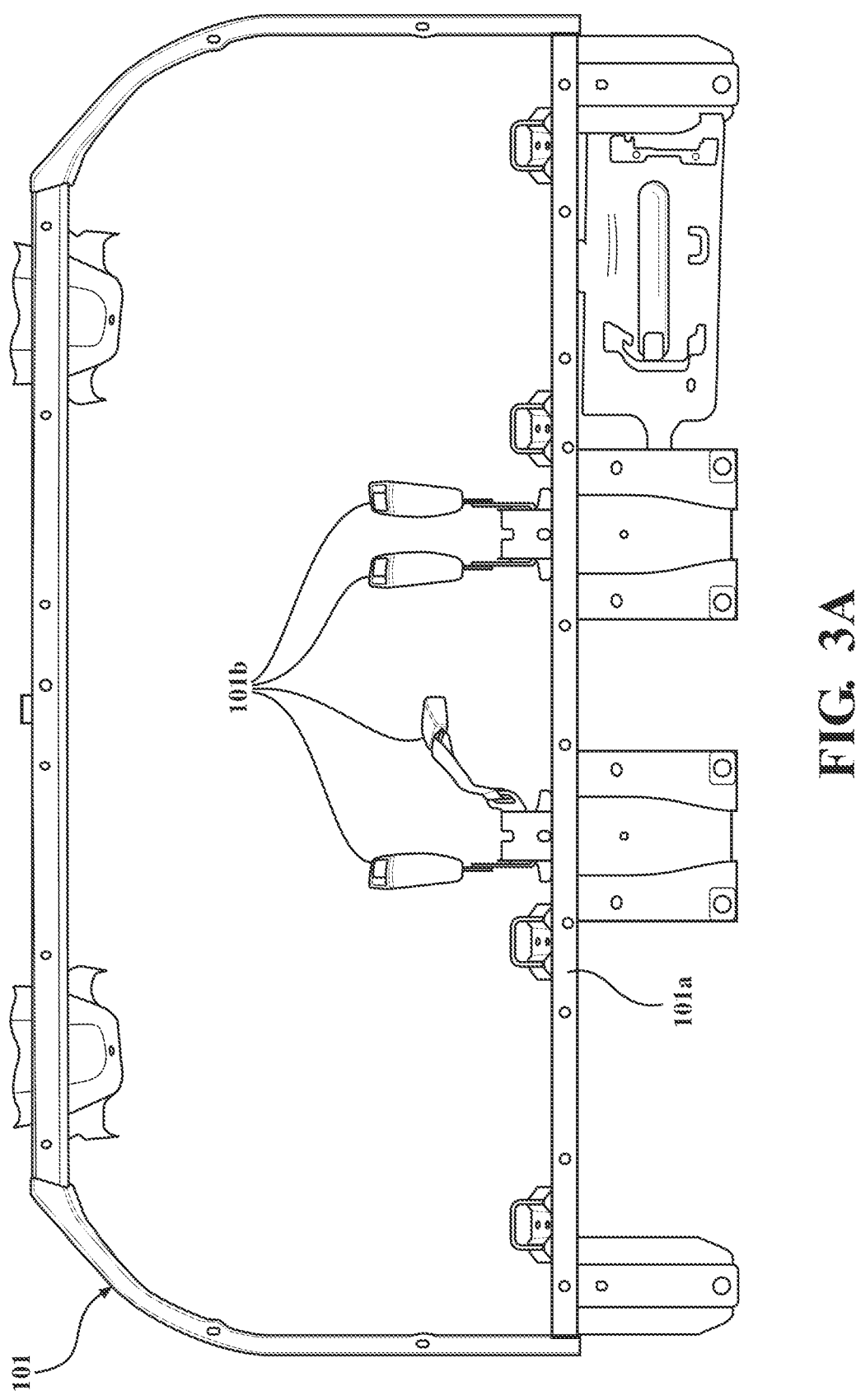
FIG. 3A is a schematic plan view of a portion of an exemplary vehicle frame without vehicle seats attached, showing a cross-member of the frame before testing of a seat mounting coupled to the frame.
Figure 3B:
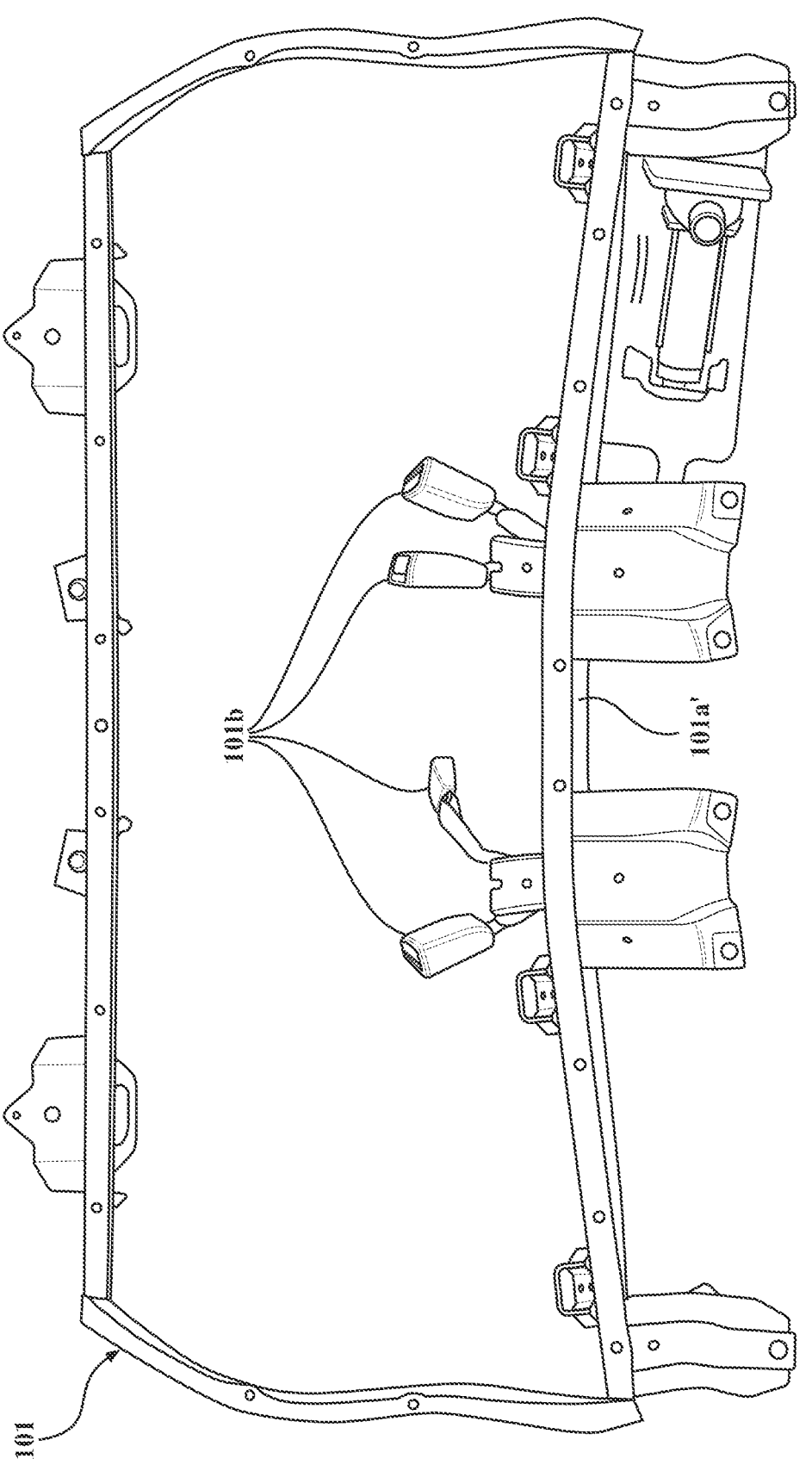
FIG. 3B is the schematic plan view of FIG. 3A, showing deformation of the cross-member of the frame after testing of a seat mounting coupled to the frame.

Responsive to application of operational loads in end-use conditions, the vehicle seats may move in a direction D1 in which the seats face and the portion of the vehicle frame to which the seats are attached may deform in the direction D1. These effects may also occur during testing of an actual vehicle frame with seats mounted thereon. FIG. 3A is a schematic plan view of a portion of an actual vehicle frame 101 to which vehicle seats may be attached, showing a cross-member 101*a* of the frame 101 before seat mounting testing ("pre test"). FIG. 3B is the schematic plan view of FIG. 3A showing the cross-member 101*a* of the frame after testing ("post test", labeled 101*a*'). The vehicle seats may be attached to the cross-member 101*a* and testing loads may be applied to the cross-member through seat belts (not shown) connected to the cross-member 101*a* via associated seat belt buckles 101*b* attached to the cross-member 101*a*. Deformation of the vehicle frame 101 and movement of attached vehicle seats during testing of an actual vehicle frame may yield important information regarding frame and seat mounting performance. Thus, testing an actual vehicle frame which permits frame deformation and seat movement may be more realistic and informative than testing using an "infinitely rigid" frame/test apparatus. However, the use (and possible destruction) of actual vehicle frames for testing purposes is expensive. In addition, because the rigid test apparatus previously described is designed to resist deformation, testing using a rigid test apparatus does not permit movement of the vehicle seats.

As stated previously, embodiments of the test fixture described herein enable movement of a vehicle seat and an associated deformation of a simulated vehicle frame due to front impact loading to be simulated using a conventional re-usable, "infinitely rigid" test frame, without the need to mount the seat on an actual vehicle frame for testing. This provides important information relating to the vehicle seat mountings without destructively testing actual vehicle frames.

Figure 4:
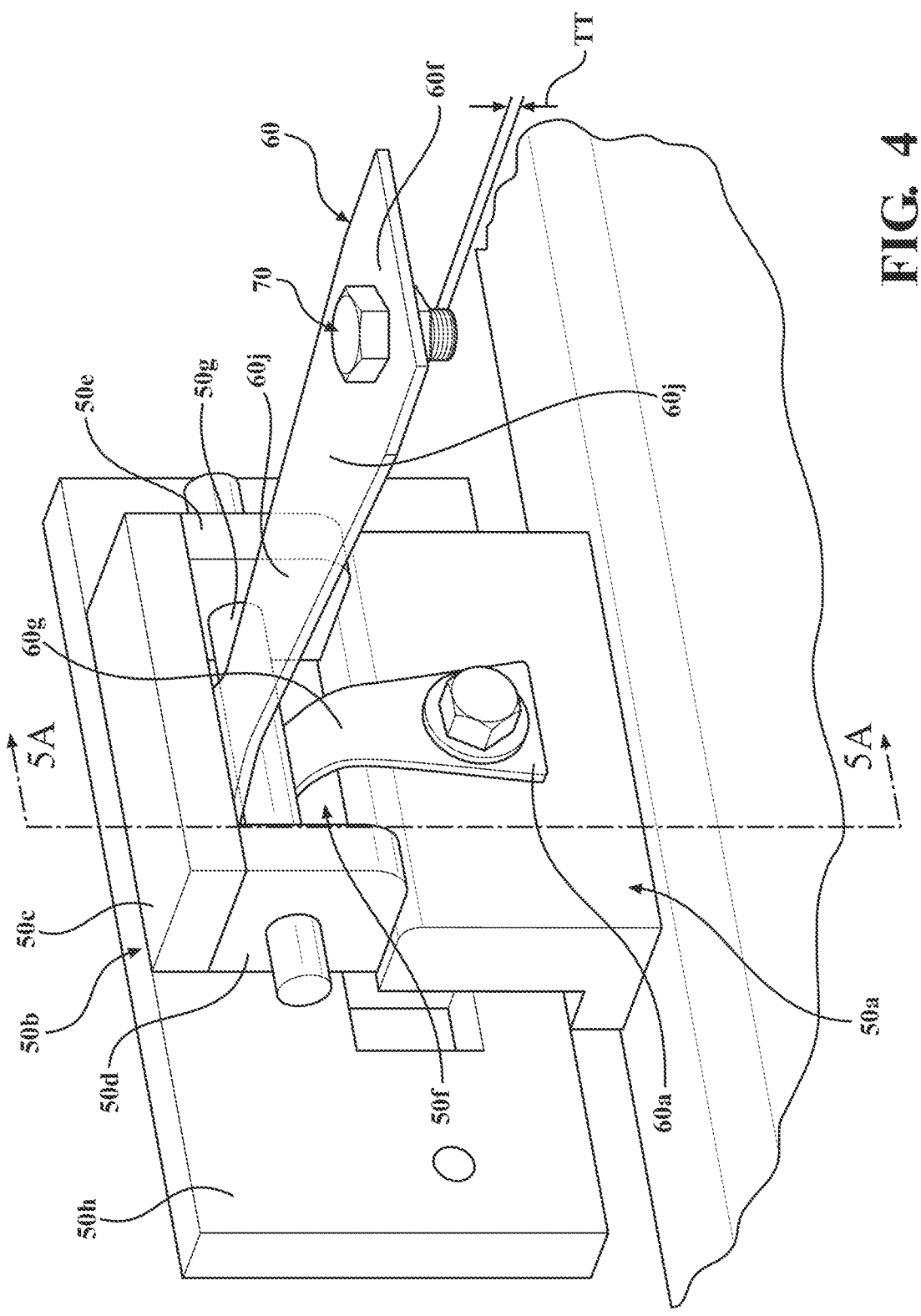
FIG. 4 is a schematic perspective view of an exemplary test fixture as shown in FIGS. 1 and 2, mounted to an upper cross-member of the testing apparatus and coupled to a seat back (not shown) of a vehicle seat.

Referring again to FIGS. 1 and 2, test fixtures 50 as described herein may be mounted to each of the seats 29*a* and 29*b* and to the cross-members 24*e*, 24*f* of the frame 24 to couple the seat to the frame 24 at specified seat-to-frame attachment locations. FIG. 4 is a schematic perspective view of an exemplary test fixture 50 as shown in FIGS. 1 and 2 mounted to the upper cross-member 24*f* and coupled to a rear seat back (not shown in FIG. 4) of a vehicle seat (such as seat 29*a*). FIGS. 1 and 2 show one example of mounting locations of test fixtures 50 for a particular test set-up. In one or more arrangements, the test fixtures 50-1 through 50-6 may all have the same basic structure and may differ only in the particular dimensions of various features of their associated energy-absorbing members 60, as described below.

Figures 5A, 5B:
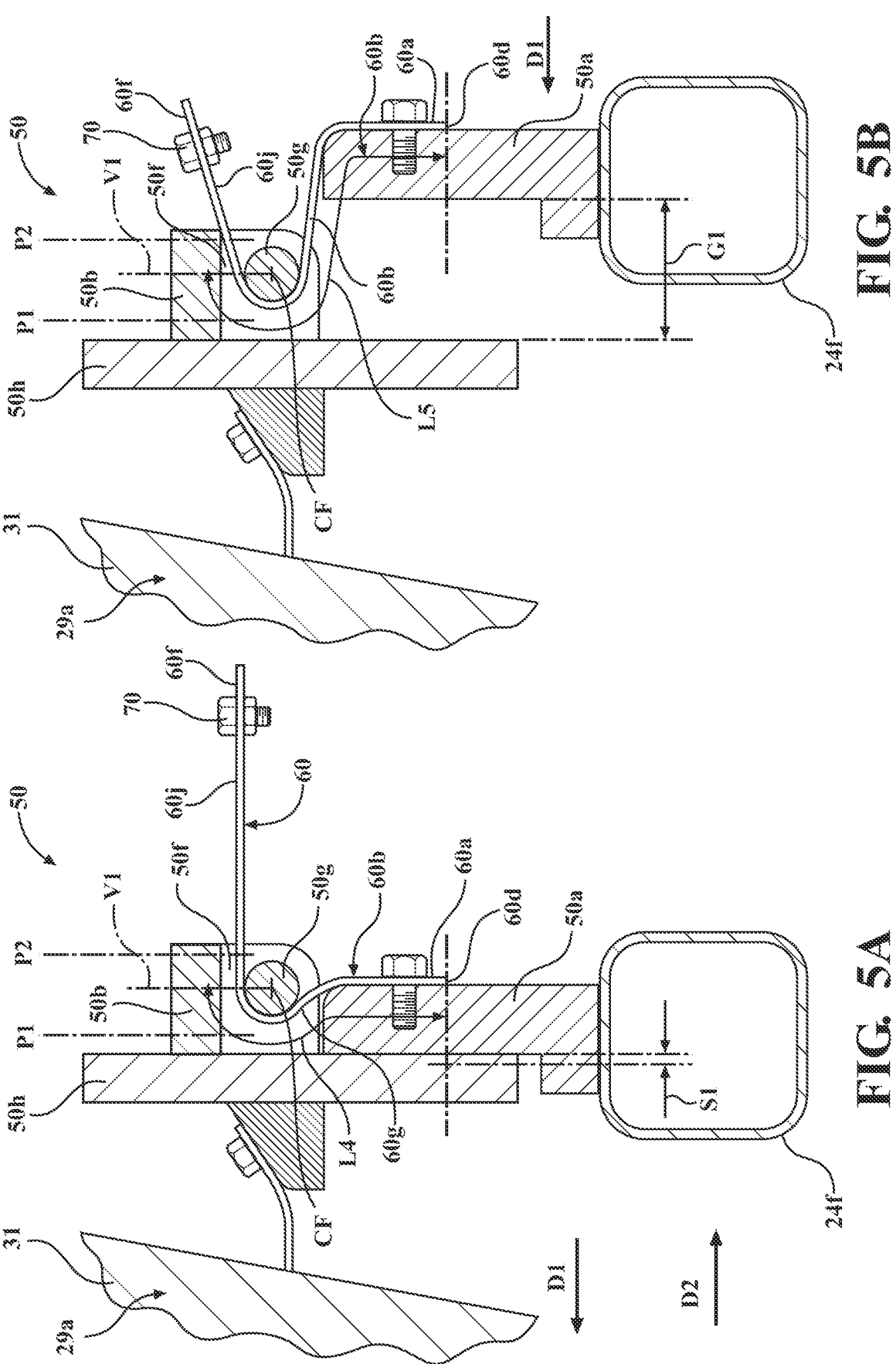
FIG. 5A is a schematic cross-sectional side view of a test fixture as shown in FIG. 4 mounted to an upper cross-member of the testing apparatus in a pre-test configuration, with an associated energy-absorbing member shown in a first (pre-testing) shape.
FIG. 5B is the schematic cross-sectional side view of FIG. 5A showing the test fixture in a post-test configuration, and with the associated energy-absorbing member shown in a second (post-test) shape.

FIG. 5A is a schematic cross-sectional side view of a test fixture 50 as shown in FIG. 4 mounted to the upper cross-member 24*f* and shown in a pre-test configuration (i.e., in a configuration prior to the start of a testing sequence). FIG. 5B is the schematic cross-sectional side view of FIG. 5A after completion of a testing sequence and forward movement of the vehicle seat 29*a*, and showing movement of the test fixture second portion 50*b* with respect to the test fixture first portion 50*a* during testing.

Referring to FIGS. 4 and 5A-5B, in one or more arrangements, each test fixture 50 may include an associated first portion 50*a* attachable to one of the upper cross-member 24*f* and lower cross-member 24*e* of the frame 24 using bolts, welds, or any other suitable attachment method. The test fixture 50 shown in FIGS. 5A-5B is shown attached to the upper cross-member 24*f*.

Each test fixture 50 may also include a second portion 50*b* separate from the first portion 50*a*. The second portion 50*b* may include a base 50*c*, a first ear 50*d* extending from the base 50*c*, and a second ear 50*e* extending from the base 50*c* opposite the first ear 50*d*. The base 50*c*, first ear 50*d*, and second ear 50*e* may combine to define a cavity 50*f* therebetween. A cylindrical fulcrum 50*g* may be positioned in the cavity 50*f* and may extend between the first ear 50*d* and the second ear 50*e*. As described herein, the fulcrum 50*g* may serve as a pivot along which an associated energy-absorbing member 60 (described in greater detail below) may slide during testing to bend the energy-absorbing member 60 from a first shape into a second, different shape. In one or more arrangements, the base 50*c*, first ear 50*d* and second ear 50*e* may be welded or otherwise suitably attached to a connecting element 50*h* which may be coupled to the vehicle seat back 31.

Each test fixture 50 may also include an associated energy-absorbing member 60 mounted therein. As mounted in the test fixture 50, each energy-absorbing member 60 may have a first end portion 60*a* attached to the test fixture first portion 50*a* and formed so as to have a first (pre-test) shape as shown in FIG. 5A when the energy-absorbing member 60 is positioned between the test fixture first portion 50*a* and second portion 50*b* and when the first portion 50*a* and second portion 50*b* are spaced apart from each other less than a predetermined distance S1 prior to testing. In one or more arrangements, the predetermined distance may be equal to 1 centimeter. In cases where the test fixture first portion 50*a* and second portion 50*b* are in direct physical contact with each other (as shown in FIG. 5A) prior to initiation of a test sequence, the distance S1 may be equal to zero. The reference character "60" will be used herein to interchangeably refer to the energy-absorbing member and the blank from which the energy-absorbing member is formed.

As seen in FIG. 5A, the energy absorbing member 60 first shape may have a formed section 60*b* structured to extend along the test fixture first portion 50*a* from a first end edge 60*d* of the member 60, into a part of the second portion cavity 50*f* residing along a first side P1 of a plane V1 extending vertically through a centroid CF of a cross-section of the fulcrum 50*g* when the test fixture 50 is mounted on the frame 24 in the position for testing. The formed section 60*b* may then contact the fulcrum 50*g* and extend around the fulcrum 50*g* along a at least a portion of a surface of the fulcrum until it intersects the plane V1. The formed section 60*b* may have a first predetermined total length L4 (i.e., a combined length of all the energy absorbing member portions extending between the first end edge 60*d* and the plane V1) when the energy absorbing member 60 has the first shape (i.e., prior to testing). In the embodiment shown in the drawings, the first tapered portion 60*h* may be secured to the test fixture first portion 50*a* using a suitable bolt. Alternative attachment methods may also be used. In alternative arrangements, the portion of the energy-absorbing member used to attach the member 60 to the test fixture first portion 50*a* may be rectangular or otherwise-shaped, rather tan being tapered.

"Formed" as applied to the energy-absorbing member 60 may refer to the application of conventional metal fabrication processes such as stamping, die forming, etc. to the energy absorbing member 60 so as to bend the energy-absorbing member to impart a distinct, pre-testing first shape and formed section 60*b* to the member 60. The energy-absorbing member 60 may be structured to be sufficiently rigid to retain the first shape unless a load sufficient to bend, distort or otherwise change the first shape is applied to the member 60 (for example, during testing of the vehicle seat mounting).

The energy-absorbing member 60 is also structured to be bendable by interaction with the test fixture first portion 50$a$ and second portion 50$b$ during testing as described herein, to plastically deform the member 60 to change the shape of the member 60 from the first shape (shown in FIG. 5A) to a second, different, post-testing shape (shown in FIG. 5B). The energy-absorbing member 60 may also be structured to retain the second shape after the test sequence has ended.

Referring to FIGS. 5A-5B, when a test sequence starts, simulated dynamic and quasi-static vehicle loading is applied to the vehicle seat (for example, seat 29$a$) generally acting in direction D1. The load may be applied to the seat 29$a$ using any known system or method (such as cables attached to the cushion underframe 26, vehicle seatbelt(s) and/or other selected portions of the seat to enable tension loads to be applied to the seat to move the seat in direction D1). Movement of the vehicle seat in direction D1 separates the test fixture second portion 50$b$ from the first portion 50$a$ and moves the second portion 50$b$ and its fulcrum 50$g$ in direction D1. Since the first end portion 60$a$ of the energy-absorbing member 60 is secured to the test fixture first portion 50$a$, movement of the fulcrum 50$g$ away from the test fixture first portion 50$a$ causes the fulcrum 50$g$ to slide along the energy-absorbing member 60, forcing the second end portion 60$f$ of the energy-absorbing member 60 opposite the first end portion 60$a$ to move upwardly and contact the test fixture second portion 50$b$ as it draws the second end portion 60$f$ toward the test fixture second portion 50$b$. This causes the energy-absorbing member 60 to bend around and along the fulcrum 50$g$, out of the first shape shown in FIG. 5A.

An allowable forward movement stroke length or limit G1 of a particular portion of seat 29$a$ attached to a particular test fixture 50 may be determined prior to testing, based on seat mounting performance requirements and other pertinent considerations. Each portion of the seat 29$a$ attached to the testing apparatus 20 by an associated test fixture may have its own allowable forward stroke depending on requirements.

When the portion of the vehicle seat 29$a$ attached to the test fixture second portion 50$b$ has reached the end of its forward movement stroke G1, the energy-absorbing member 60 has been plastically-deformed into the second shape shown in FIG. 5B. Thus, the test fixture 50 is structured so that movement of the second portion 50$b$ in a direction away from the first portion 50$a$ causes the fulcrum 50$g$ to slide along the energy absorbing member 60 such that sliding of the fulcrum 50$g$ along the energy absorbing member 60 plastically deforms the energy absorbing member 60 into the second shape different from the first shape. Thus, the forces acting on the seat to move the seat in direction D1 are absorbed or dissipated in bending the energy-absorbing members 60 of the test fixtures from the first shape of FIG. 5A to the second shape of FIG. 5B.

It may be remembered that the formed section 60$b$ of the member 60 extends along the test fixture first portion 50$a$ from the first end edge 60$d$ of the member 60, into the second portion cavity 50$f$ along the first side P1 of the fulcrum 50$g$, and around the fulcrum 50$g$ along the fulcrum to the plane V1. After the energy-absorbing member 60 has been bent or "re-formed" into the second shape of FIG. 5B by movement of the test fixture second portion 50$b$ in direction D1 away from first portion 50$a$ during testing, the total length of the formed section 60$b$ may be L5, which is greater than L4. The stroke G1 of the portion of the seat attached to the test fixture second portion 50$b$ may be equal to the increase in total length of the formed section (i.e., the difference L5–L4).

The test fixtures 50 coupling the vehicle seats to the frame 24 are designed to enable movement of the vehicle seats responsive to test loads simulating actual front impact conditions, while using an "infinitely rigid" testing frame. The forces resisting seat movement, which would normally be generated by an actual vehicle frame, are instead generated by the test fixtures 50 coupling the vehicle seats 29$a$, 29$b$ to the "infinitely rigid" test frame 24. This enables movement of vehicle seats and plastic deformation of an actual vehicle frame to be simulated during testing while using an "infinitely rigid" test frame 24 instead of a frame of an actual vehicle, which greatly reduces testing costs.

Referring again to FIGS. 5A and 5B, in certain arrangements, a hard stop 70 may be secured to the energy-absorbing member second end portion 60$f$. The hard stop 70 may be structured to prevent entry of the second end portion 60$f$ into the test fixture second portion cavity 50$f$. The fixed position of the hard stop 70 along the energy-absorbing member 60 may be determined in accordance with a maximum amount the portion of the vehicle seat attached to the test fixture 50 may be allowed to travel in direction D1 during testing (i.e., the allowable forward "stroke" of the portion of the vehicle seat) to prevent damage to the test apparatus 20 through excessive movement of the vehicle seat. Contact between the hard stop 70 and the test fixture second portion 50$b$ during testing prevents further movement of the energy-absorbing member second end portion 60$f$ toward the cavity 50$f$, thereby halting further motion of the seat 29$a$ in direction D1 and restricting travel of the attached portion of the vehicle seat to the allowable stroke G1.

Figure 6A:
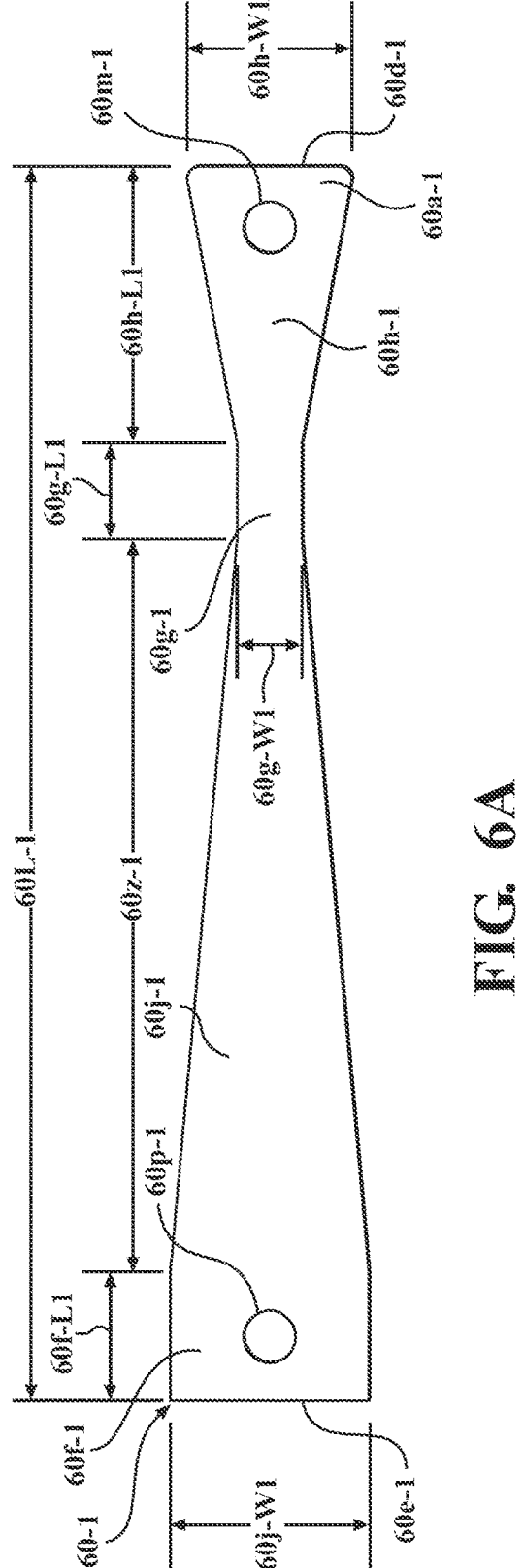
FIG. 6A is a schematic plan view showing an example of a first flat energy-absorbing member blank prior to bending into an associated first shape for mounting into a test fixture prior to testing.
Figure 6B:
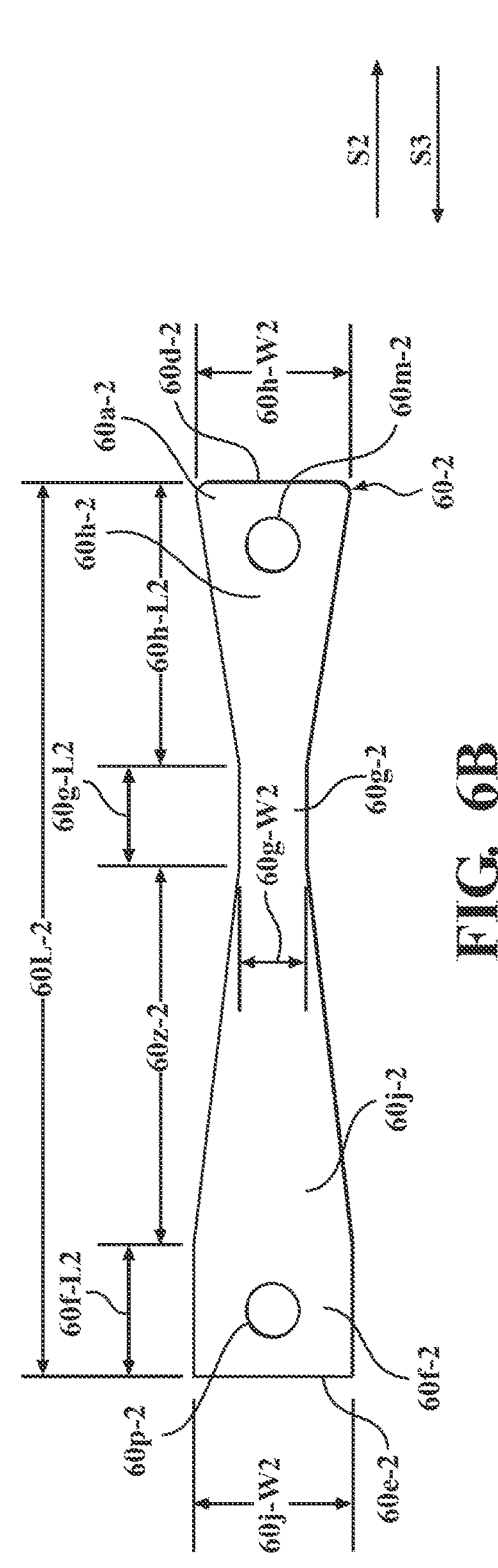
FIG. 6B is a schematic plan view showing an example of a second flat energy-absorbing member blank prior to bending into an associated first shape for mounting into a test fixture prior to testing.

FIGS. 6A and 6B show examples of flat energy-absorbing member blanks 60-1 and 60-2 prior to bending into associated first shapes as shown in FIG. 5A, for mounting between associated test fixture first and second portions 50$a$ and 50$b$ prior to testing. In particular arrangements, each energy-absorbing member 60 may be formed from a steel stamping having some common general characteristics as shown in FIGS. 6A-6D.

In one or more arrangements, each of energy-absorbing member blanks 60-1, 60-2 may be formed from a flat piece of metallic material, such as a suitable steel. Each of energy-absorbing blanks 60-1 and 60-2 may have an associated uniform part thickness TT equal to the thickness of a sheet material used to fabricate the respective member. The thickness of each energy-absorbing blank may be specified as described herein, according to the estimated stresses that the formed energy-absorbing member will undergo during testing.

Each of the exemplary energy-absorbing member blanks 60-1, 60-2 shown in FIGS. 6A and 6B may have an associated overall length 60L. For example, energy-absorbing member 60-1 has an overall length 60L-1 and energy-absorbing member 60-2 has an overall length 60L-2 which is less than 60L-1.

Each blank may have a first edge 60$d$ at the first end portion 60$a$ and a second end edge 60$e$ residing opposite the first end edge 60$d$ along an overall length 60L of the piece of material forming the blank. For example, referring to FIG. 6A, blank 60-1 may have a first end edge 60$d$-1 at the first end portion 60$a$-1 of the blank and a second end edge 60$e$-2 residing opposite the first end edge 60$d$-2 along an overall length 60L-2 of the piece of material. A second end portion 60$f$-1 of the first blank having a length 60$f$-L1 may extend from and include the second end edge 60$e$-1. A second end portion 60$f$-2 of the second blank having a length 60$f$-L2 may extend from and include the second end edge 60$e$-2.

Each blank may have a necked portion 60$g$ positioned between the first end edge 60$d$ and the second end edge 60$e$. For example, a necked portion 60$g$-1 having a length 60$g$-L1 may be positioned between the first end edge 60$d$-1 and the second end edge 60$e$-1 of the first blank 60-1. A necked portion 60$g$-2 having a length 60$g$-L2 may be positioned between the first end edge 60$d$-2 and the second end edge 60$e$-2 of the first blank 60-2.

Each blank may have a first tapered portion 60$h$ extending from the first end edge 60$d$ to the necked portion 60$g$. For example, the blank 60-1 may include a first tapered portion 60$h$-1 having a length 60$h$-L1 extending from the first end edge 60$d$-1 to the necked portion 60$g$-1. The first tapered portion 60$h$-1 may have a width 60$h$-W1 that decreases uniformly with distance in a direction S3 extending from the first end edge 60$d$-1 toward the necked portion 60$g$-1. The blank 60-2 may include a first tapered portion 60$h$-2 having a length 60$h$-L2 extending from the first end edge 60$d$-2 to the necked portion 60$g$-2. The first tapered portion 60$h$-2 may have a width 60$h$-W2 that decreases uniformly with distance in the direction S3 toward the necked portion 60$g$-2.

Each blank may have a second tapered portion 60$j$ extending from the second end portion 60$f$ to the necked portion 60$g$. For example, a second tapered portion 60$j$-1 may extend from the second end portion 60$f$-1 to the necked portion 60$g$-1. the second tapered portion 60$j$-1 may have a width 60$j$-W1 that decreases in a direction S2 extending from the second end portion 60$f$-1 to the necked portion 60$g$-1. The second tapered portion 60$j$-1 may also have a length 60$z$-1. In addition, a second tapered portion 60$j$-2 may extend from the second end portion 60$f$-2 to the necked portion 60$g$-2. the second tapered portion 60$j$-2 may have a width 60$j$-W2 that decreases in the direction S2 extending from the second end portion 60$f$-2 to the necked portion 60$g$-2. The second tapered portion 60$j$-2 may also have a length 60$z$-2.

In particular arrangements, the second end portion width 60$j$-W1 is constant along the length dimension 60$f$-L1 of the second end portion 60$f$-1. In particular arrangements, the necked portion width 60$g$-W1 is constant along a length 60$g$-L1 of the necked portion. In particular arrangements, the second end portion width 60$j$-W2 is constant along the length dimension 60$f$-L2 of the second end portion 60$f$-2. In particular arrangements, the necked portion width 60$g$-W2 is constant along a length 60$g$-L2 of the necked portion.

An opening 60-$m$1 may be formed in the first end portion 60$a$-1 of blank 60-1 to enable attachment of the first end portion 60$a$-1 to an associated test fixture first portion 50$a$ using a bolt or other suitable fastener. One or more other opening(s) 60-$p$1 may be formed in the second end portion 60$f$-1 of blank 60-1 to enable attachment of a hard stop 70 to the second end portion 60$f$-1 using a bolt or other suitable fastener. Similarly, an opening 60-$m$2 may be formed in the first end portion 60$a$-2 of blank 60-2 to enable attachment of the first end portion 60$a$-2 to an associated test fixture first portion 50$a$ using a bolt or other suitable fastener. One or more other opening(s) 60-$p$2 may be formed in the second end portion 60$f$-2 of blank 60-2 to enable attachment of a hard stop 70 to the second end portion 60$f$-2 using a bolt or other suitable fastener.

Mounting of an exemplary energy-absorbing member blank on the test fixture first and second portions as shown in FIG. 5A now be described. The following description of how a blank 60 is formed into a respective first shape and mounted in an associated test fixture will apply to the exemplary blanks shown in FIGS. 6A-6B and also to other blanks to be used in the test fixture embodiments described herein.

Referring to FIGS. 4, 5A-5B, and 6A-6B, after forming from a shape as shown in FIGS. 6A-6B into the first shape, an energy-absorbing member having the first shape may be positioned between the first portion 50$a$ and the second portion 50$b$ of an associated test fixture 50. The blank 60 may be formed so that, when positioned between the test fixture first portion 50$a$ and second portion 50$b$, the first tapered portion 60$h$ of the formed blank may rest against a rear face of the test fixture first portion 50$a$ as shown in FIGS. 4 and 5A, where it may be attached to the test fixture first portion 50$a$ using a bolt or other fastener. In the formed energy-absorbing member, the necked portion 60$g$ of the blank extends from the first end portion 60$a$ and wraps around the fulcrum 50$g$ within the cavity 50$f$, ending approximately at plane V1 (FIG. 5A).

From the end of the necked portion 60$g$ at plane V1, the second tapered portion 60$j$ may extend out of the cavity 50$f$ in a direction D2 (FIG. 5A) rearwardly of the test fixture 50. The energy-absorbing member second end portion 60$f$ may form a free end of the energy-absorbing member 60 when the member is mounted between the test fixture first and second portions 50$a$, 50$b$ (i.e., the second end portion 60$f$ may not be directly physically attached to either of the test fixture first and second portions 50$a$, 50$b$). In this arrangement, the second end portion 60$f$ may be free to move in direction S3 toward the test fixture second portion 50$b$ responsive to movement of the test fixture second portion 50$b$ in direction D1 relative to the test fixture first portion 50$a$ during testing. Thus, the second tapered portion 60$j$ and the second end portion 60$f$ of the blank 60 may not undergo a forming operation prior to testing to generate the first shape. The unformed second tapered portion 60$j$ and second end portion 60$f$ of the blank 60 may simply extend rearwardly from the test fixture second portion 50$b$ in direction D2 as shown in FIG. 5A.

As seen in FIGS. 6A and 6B, different embodiments 60-1 and 60-2 of the blanks may have different overall lengths. In one or more arrangements, the differences in overall lengths may be due to differences in the lengths of the respective second tapered portions 60$j$-1 and 60$j$-2. The lengths of the second tapered portion 60$j$ of any blank may be specified according to an allowable forward stroke G1 of a particular portion of the vehicle seat to which the test fixture 50 including the formed blank 60 is attached. This is because different portions of a vehicle seat may have different strokes G1 and may move different distances in direction D1 with respect to the cross-members 24$e$ and 24$f$ during testing. Thus, for example, an upper portion of the seat 29$a$ coupled to test fixture 50-1 in FIG. 2 may move farther from upper cross-member 24$f$ during testing than a lower portion of the same seat would move from lower cross-member 24$e$. The distances that respective portions of a vehicle seat may be allowed to move forward from a respective one of the lower and upper cross-members 24$e$, 24$f$ may be determined according to seat mounting design parameters.

The length 60$z$ of the second tapered portion 60$j$ of any blank may be specified so that, during movement of the portion of the seat coupled to the associated test fixture, the second tapered portion 60$j$ is forced into the test fixture cavity 50$f$ and forced to progressively wrap around the fulcrum 50$g$ as shown in FIG. 5B by movement of the test fixture second portion 50$b$ in direction D1 away from test fixture first portion 50*a*. As the fulcrum 50*g* moves forward and draws the second tapered portion 60*j* into the cavity 50*f* and along the fulcrum, the fulcrum 50*g* slides along the energy-absorbing member second tapered portion 60*j* and the energy-absorbing member is bent from the first shape of FIG. 5A into the second shape of FIG. 5B. The energy of motion of the seat during testing is absorbed in this bending of the energy-absorbing member.

In particular arrangements, the length 60*z* of the second tapered portion 60*j* may be specified so that a junction between the second tapered portion 60*j* and the second end portion 60*f* reaches the plane V1 when the portion of the vehicle seat coupled to the test fixture 50 including the energy-absorbing member 60 has reached the end of its stroke G1. This arrangement may allow for bending of the energy-absorbing member (and the associated absorption of the energy of seat movement) along the entire length G1 of the movement stroke of the portion of the seat.

Based on testing of vehicle seats mounted on actual vehicle frames, it has been found that the maximum magnitude of the reaction force acting on a given portion of the vehicle seat mounting structure attached to the seat during seat movement varies with the location of the portion of the mounting structure. Thus, for example, the maximum force acting on an energy-absorbing member incorporated into test fixture 50-1 coupled to an upper, farther-moving portion of the seat may be greater than the maximum force acting on test fixture 50-3 coupled to a lower portion of the seat which does not move as far forward during testing as the upper portion of the seat.

It has also been found that the maximum displacement or "stroke" of a given portion of the vehicle seat during a simulated collision event varies with the location of portion of the vehicle seat. As stated previously, the allowable stroke of a portion of the vehicle seat during a simulated collision event may be determined with reference to seat mounting structure design parameters.

It has also been found that, for any given vehicle seat attachment location, the force required to move an attached portion of the seat may vary substantially linearly with a distance that the portion of the seat from has moved from its pre-test position along its stroke. Thus, the farther the portion of the seat moves along its allowable stroke, the greater the force required to move the move the portion of the seat further along its stroke.

The test fixture and associated energy-absorbing member embodiments described herein may be structured to operate in accordance with these findings, while permitting an attached vehicle seat to move in a manner similar to that resulting from testing of a seat mounting structure using an actual vehicle frame.

The amount of force required to bend the energy-absorbing member from the first shape (FIG. 5A) to the second shape (FIG. 5B) as it is drawn through the test fixture second portion cavity may depend on the properties of the material from which the blank is formed and the cross-sectional area of the portion of the member being bent (around the fulcrum). The force-absorption capacity or force-stroke characteristics of each energy-absorbing member may be adjusted or "tuned" by appropriately controlling the cross-sectional area of the blank. Thus, to absorb the seat movement energy at the location of each attached test fixture 50, the cross-sectional area of the energy-absorbing member 60 may be varied along the length of the member according to the localized energy dissipation requirements at the respective location, by the tapering of the second tapered portion 60*j*. Also, the stroke of the energy-absorbing member may be adjusted or "tuned" by appropriately controlling the length of the second tapered portion 60*j*.

For example, to dissipate the increased force exerted on the upper portion of the seat as it moves farther forward in direction D1, the cross-sectional area of the energy-absorbing member 60 may be gradually increased in correspondence with the increase in force by providing the second tapered portion 60*j*. Then, as the attached portion of the seat moves forward and the force on this portion of the seat increases, the second tapered portion 60*j* of the energy-absorbing member 60 is drawn into the cavity 50*f* to be bent around the fulcrum 50*g* as the fulcrum slides along the second tapered portion 60*j*. As the second tapered portion 50*j* progressively moves along the fulcrum 50*g*, the force required to bend the second tapered portion 50*j* increases because of the increase in cross-sectional area (due to the taper) of the second tapered portion. Also, to further increase (or decrease) the energy-absorbing capability of an energy-absorbing member 60 as required, a blank from which the energy-absorbing member is formed may be fabricated from a relatively thicker (or thinner) material (i.e., by varying the material thickness TT).

Figure 7:
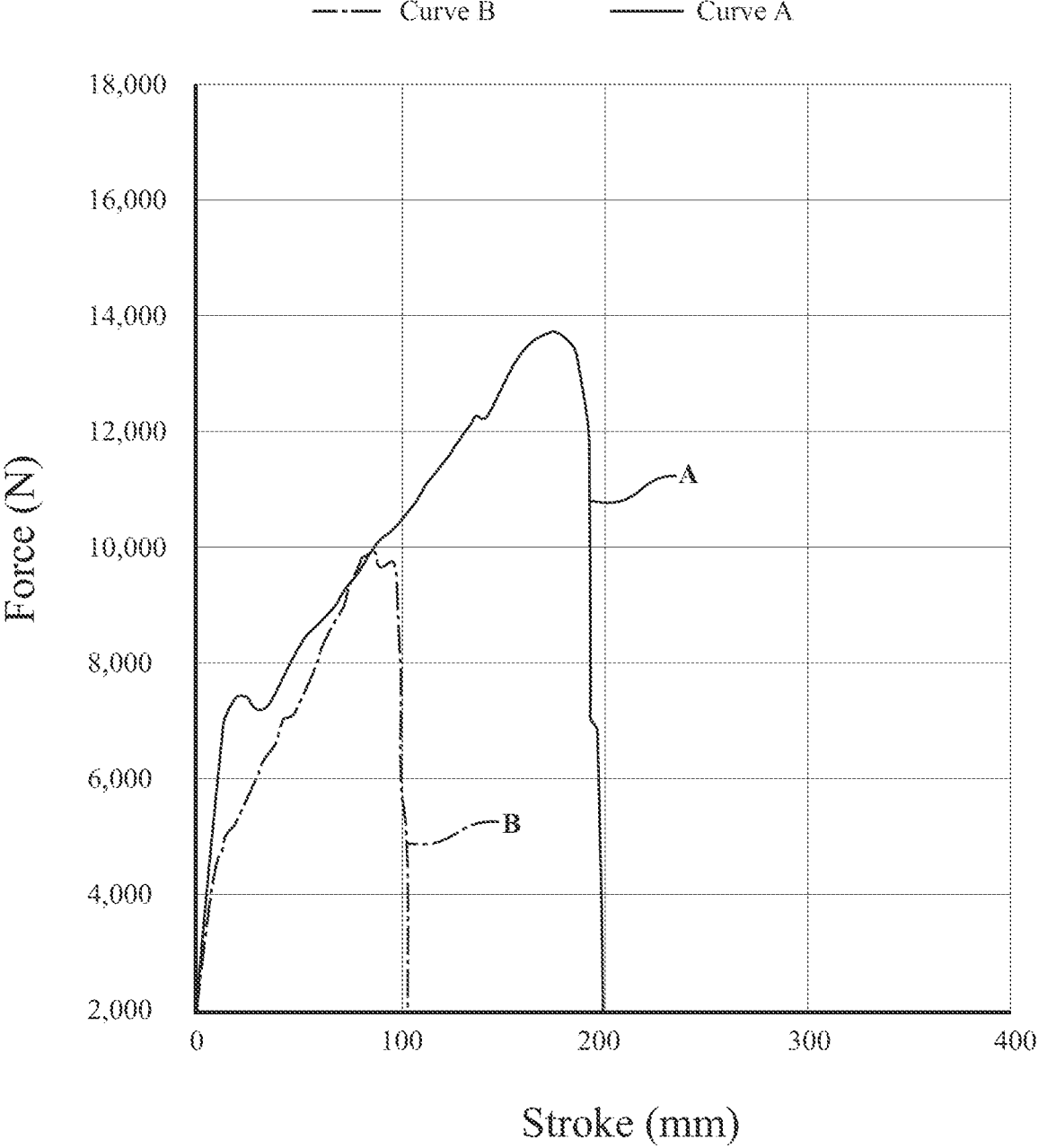
FIG. 7 is a schematic plot of force vs. displacement for a pair of exemplary energy-absorbing members formed from blanks as shown in FIGS. 6A-6B, showing a comparison of the relative maximum forces acting on the energy-absorbing members, and showing the relative stroke lengths of respective portions of the vehicle seat coupled to the energy-absorbing members.

FIG. 7 is a schematic plot of force vs. displacement for a pair of exemplary energy-absorbing members formed from blanks as shown in FIGS. 6A-6B, showing a comparison of the relative maximum forces acting on the energy-absorbing members, and showing the relative stroke lengths of respective portions of the vehicle seat coupled to the energy-absorbing members. Curve "A" represents the force required to move an attached portion of the seat in direction D1 plotted against a distance the portion of the seat has moved along a relatively longer allowable stroke. This required movement force corresponds to the force required to bend the energy-absorbing member around the fulcrum at an associated location along the relatively longer second tapered portion of member 60-1 as the fulcrum 50*g* slides along the second tapered portion 60*j*. Thus, the area under the curve "A" represents the work required to bend the energy-absorbing member 60-1 from the first shape into the second shape. The longer second tapered portion 60*j*-1 may also accommodate a relatively longer stroke of a portion of the vehicle seat to which the second tapered portion 60*j*-1 is attached.

Curve "B" represents the force required to move an attached portion of the seat in direction D1 plotted against a distance the portion of the seat has moved along a relatively shorter allowable stroke. This required movement force corresponds to the force required to bend the energy-absorbing member around the fulcrum at an associated location along the relatively shorter second tapered portion of member 60-2 as the fulcrum 50*g* slides along the second tapered portion 60*j*. Thus, the area under the curve "B" represents the work required to bend the energy-absorbing member 60-2 from the first shape into the second shape. The shorter second tapered portion 60*j*-2 may also accommodate a relatively shorter stroke of a portion of the vehicle seat to which the second tapered portion 60*j*-2 is attached.

In view of the above, by controlling the cross-sectional area of the blank in accordance with estimated forces to be exerted on the portion of the seat to be coupled to the formed blank, and by controlling the length of the second tapered portion in accordance with the associated stroke length G1 of the portion of the seat as previously described, the energy-absorbing capability of the energy-absorbing member may be adjusted in accordance with the estimated forces to be exerted on an associated portion of the seat during testing.

In another aspect, referring to the drawings, test fixture embodiments (generally designated 50) described herein may include first a portion 50*a* and a second portion 50*b* separate from the first portion 50*a*. The second portion 50*b* may include a base 50*c*, a first ear 50*d* extending from the base 50*c*, and a second ear 50*e* extending from the base opposite the first ear 50*d*. The base 50*c*, first ear 50*d*, and second ear 50*e* may combine to define a cavity 50*f* therebetween. A fulcrum 50*g* may be positioned in the cavity 50*f* and may extend between the first ear 50*d* and the second ear 50*e*. The test fixture may also include an energy absorbing member 60 having a formed section 60*b* attached to the test fixture first portion 50*a* and shaped so as to extend along the test fixture first portion 50*a*, into the cavity 50*f* along a first side of the fulcrum 50*g*, and around the fulcrum 50*g* to a second side of the fulcrum within the cavity 50*f*. The formed section 60*b* may have a first length L4 when the first portion 50*a* and second portion 50*b* are spaced apart less than a predetermined distance S1. The test fixture 50 may be structured so that movement of the first portion 50*a* in a direction away from the second portion 50*b* causes the fulcrum 50*g* to slide along the energy absorbing member 60, and so that sliding of the fulcrum 50*g* along the energy absorbing member 60 plastically deforms the energy absorbing member 60 so that the formed section 60*b* has a second length greater L5 than the first length L4.

The range of forces acting on the various portions of the vehicle seat during testing may be determined by calculation and/or experimentation using known methods. From this data, the forces acting on a test fixture second portion coupled to the seat at each location may be estimated. The stroke lengths of various portions of the vehicle seat for a given vehicle seat mounting structure may also be estimated by calculation and/or experimentation using known methods. The forces required to bend the energy-absorbing members during testing may also be determined by calculation and/or experimentation for energy-absorbing members having various thickness and width dimensions. Analysis of the above-mentioned data may be used to relate the required bending forces to the respective energy-absorbing member geometries and to the forces acting on the various portions of the vehicle seat during testing, so that the particular dimensions of suitable energy-absorbing member blanks may be fabricated according to the specific force requirements of associated seat attachment locations.

In one or more example, simulations using CAE models of elements such as a vehicle frame, an infinitely rigid testing apparatus, and various energy-absorbing members may be run to simulate the applied loads and resulting reaction forces on the various components.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A test fixture for a testing a vehicle seat mounting, the fixture comprising:
   a first portion;
   a second portion separate from the first portion and including a fulcrum supported thereon;
   an energy absorbing member attached to the test fixture first portion and extending around a portion of the fulcrum, the energy absorbing member being formed from a flat piece of metallic material having:
   a first end edge;
   a second end edge residing opposite the first end edge along a length of the piece of material;
   a second end portion extending from and including the second end edge;
   a necked portion positioned between the first end edge and the second end edge;
   a first tapered portion extending from the first end edge to the necked portion, the first tapered portion having a width that decreases in a direction extending from the first end edge to the necked portion; and
   a second tapered portion extending from the second end portion to the necked portion, the second tapered portion having a width that decreases in a direction extending from the second end portion to the necked portion.

2. The test fixture of claim 1 wherein the second end portion has a constant width.

3. The test fixture of claim 1 wherein the necked portion has a constant width.

4. The test fixture of claim 1, wherein the test fixture second portion includes a base, a first ear extending from the base, and a second ear extending from the base opposite the first ear, the base, first ear, and second ear combining to define a second portion cavity therebetween, and wherein the fulcrum is positioned in the cavity and extends between the first ear and the second ear.

5. The test fixture of claim 4 further comprising a hard stop attached to the energy absorbing member and structured to prevent entry of a portion of the energy absorbing member to which the hard stop is attached into the cavity.

6. The test fixture of claim 1, wherein the energy absorbing member is formed so as to have a first shape when the test fixture first portion and second portion are spaced apart less than a predetermined distance, and wherein the test fixture is structured so that movement of the second portion in a direction away from the first portion causes the fulcrum to slide along the energy absorbing member, and wherein sliding of the fulcrum along the energy absorbing member plastically deforms the energy absorbing member into a second shape different from the first shape.

7. The test fixture of claim 6, wherein the energy absorbing member has a formed section extending along the test fixture first portion, between the test fixture first portion and the fulcrum, and around the fulcrum and along at least a portion of the fulcrum, and wherein the formed section has a first length when the energy absorbing member has the first shape and a second length greater than the first length when the energy absorbing member has the second shape.

8. The test fixture of claim 6, wherein the energy absorbing member has a first end edge secured to the test fixture first portion and a second end edge residing opposite the first end edge along a length a piece of material from which the energy absorbing member is formed, and wherein the test fixture is structured so that sliding of the fulcrum along the energy absorbing member during movement of the test fixture second portion with respect to the test fixture first portion operates to move the second end edge toward the test fixture second portion.

9. A vehicle seat testing apparatus including a test fixture in accordance with claim 1.

10. A test fixture for a testing a vehicle seat mounting, the test fixture comprising:
   a first portion;
   a second portion separate from the first portion, the second portion including:
      a base;
      a first ear extending from the base;
      a second ear extending from the base opposite the first ear, the base, first ear, and second ear combining to define a cavity therebetween;

a fulcrum positioned in the cavity and extending between the first ear and the second ear; and
   an energy absorbing member having a first tapered portion, a second tapered portion, and a necked portion positioned between the first and second tapered portions, the energy absorbing member including a formed section attached to the test fixture first portion and shaped so as to extend along the test fixture first portion, into the cavity, and along at least a portion of the fulcrum, the formed section having a first length when the first portion and second portion are spaced apart less than a predetermined distance,
   wherein movement of the first portion in a direction away from the second portion causes the fulcrum to slide along the energy absorbing member, and wherein sliding of the fulcrum along the energy absorbing member plastically deforms the energy absorbing member so that the formed section has a second length greater than the first length.

11. The test fixture of claim 10, wherein the energy absorbing member has a first end edge secured to the test fixture first portion and a second end edge residing opposite the first end edge along a length a piece of material from which the energy absorbing member is formed, and wherein the test fixture is structured so that sliding of the fulcrum along the energy absorbing member during movement of the test fixture second portion with respect to the test fixture first portion operates to move the second end edge toward the test fixture second portion.

\* \* \* \* \*